June 1, 1965  R. C. BASSETT  3,186,403
PERSPECTIVE VECTORCARDIOSCOPE
Filed Nov. 13, 1962  4 Sheets-Sheet 4

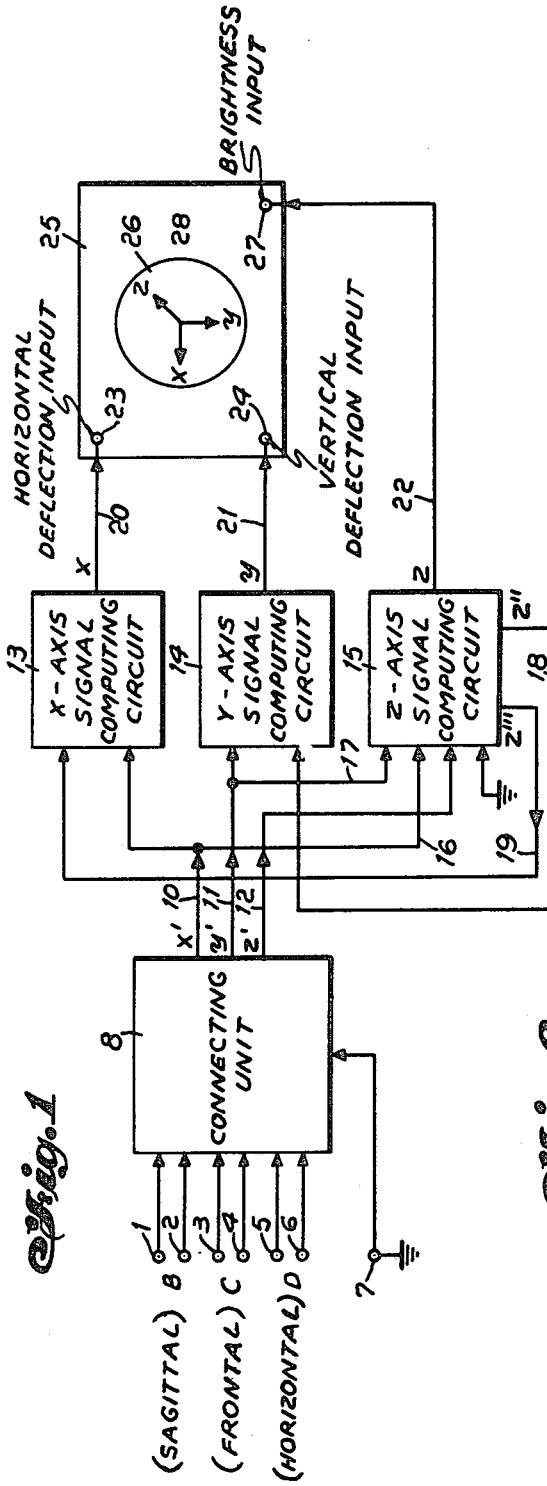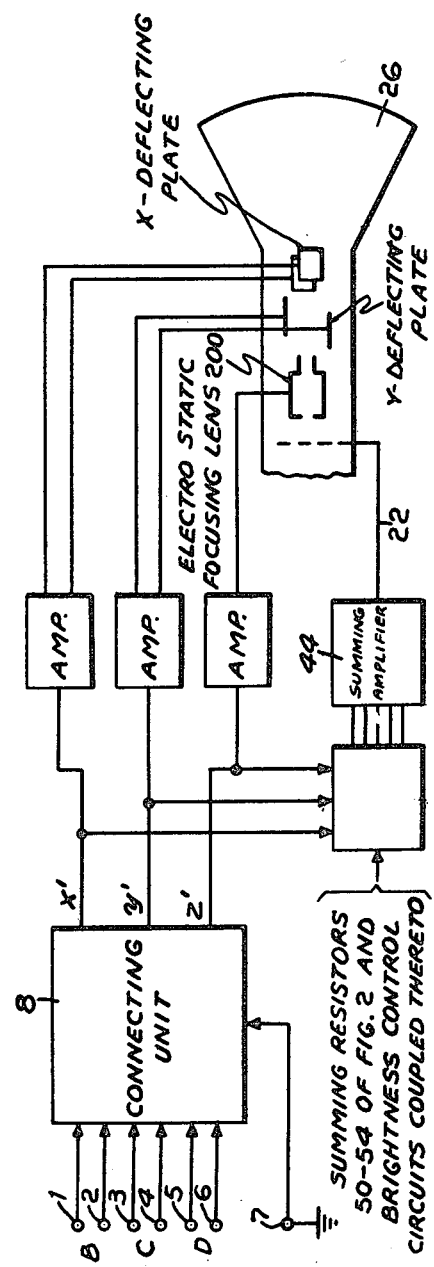

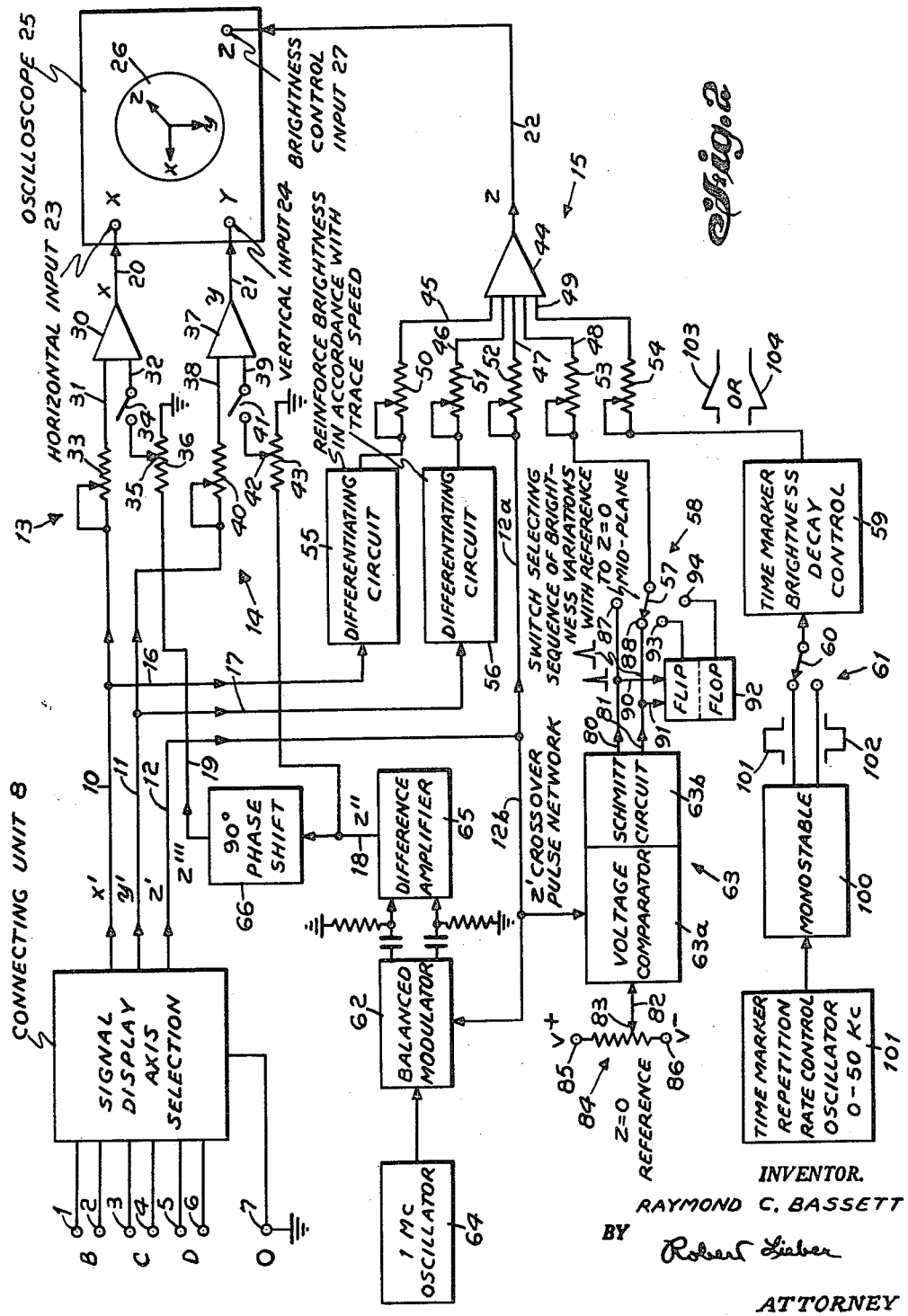

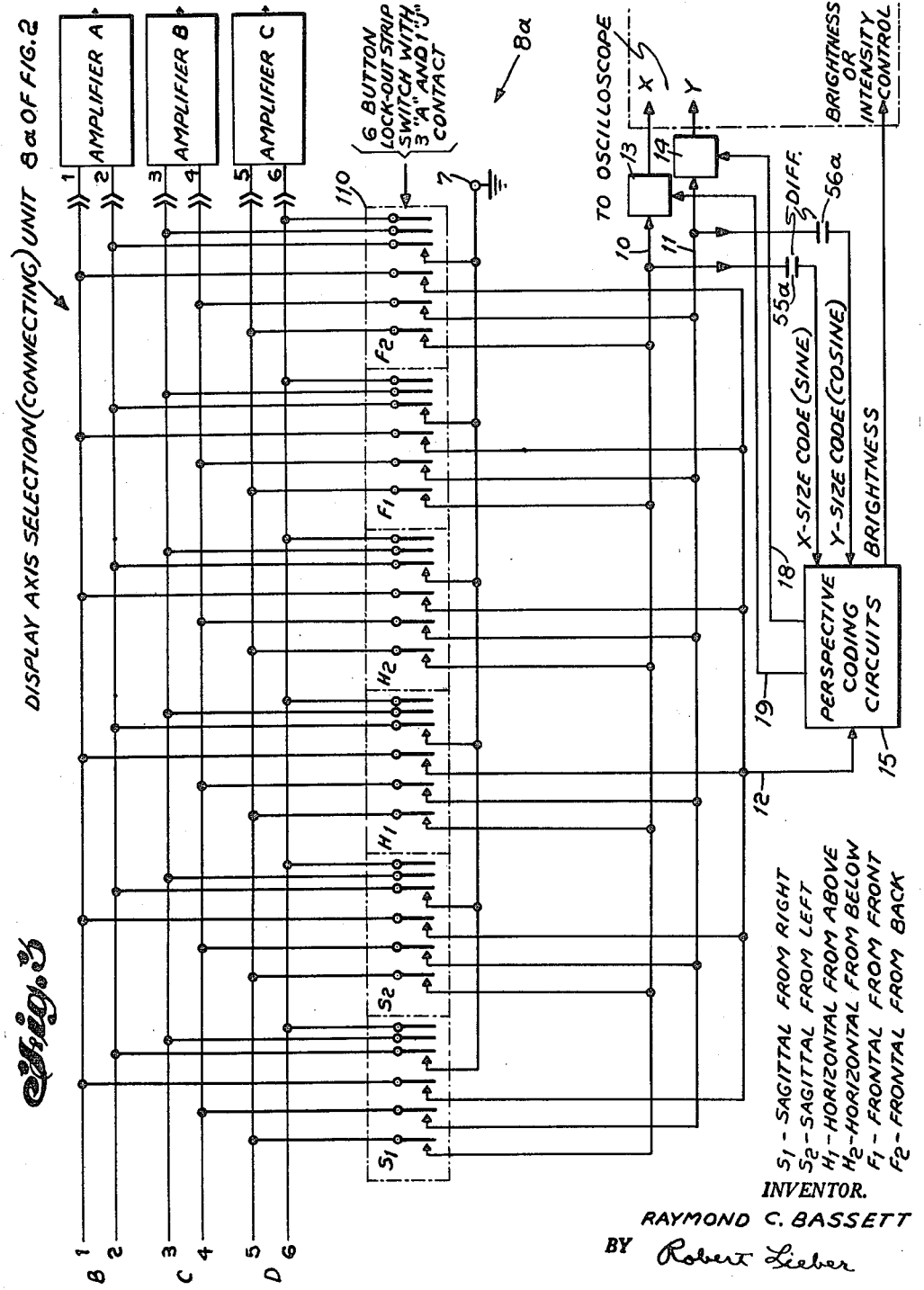

INVENTOR.
RAYMOND C. BASSETT
BY Robert Lieber
ATTORNEY

3,186,403
PERSPECTIVE VECTORCARDIOSCOPE
Raymond C. Bassett, West Caldwell, N.J., assignor to International Telephone and Telegraph Corporation, Nutley, N.J., a corporation of Maryland
Filed Nov. 13, 1962, Ser. No. 237,062
4 Claims. (Cl. 128—2.06)

This relates generally to cathode ray tube display systems for displaying a perspective view of the trace of a three-coordinate vector in two dimensions.

There are a number of cathode ray tube display systems which purport to provide an impression of perspective. One such system employs two cathode ray tubes and a stereoscopic viewing arrangement, this dulication of system elements obviously increasing the complexity and cost, and reducing the reliability of the system.

Another prior art arrangement employs a complicated raster scan technique which enables the electron beam spot of a single cathode ray tube to trace out a series of rectangular patterns, the boundaries of which represent the intersections of parallel planes with a cube, as viewed in perspective. Thus, an illusion of perspective is created via this "cubic" raster, individual parallel lines "running into" the display approaching each other as would be expected for a view in perspective. It had been suggested, for the sake of avoiding ambiguity in the "cubic" display, to variably brighten "near" lines in relation to "far" lines in the cube, but it is noted, for reasons that will become apparent hereinafter, that the individual lines in the suggested arrangement would each be of uniform thickness and brightness.

An object of the invention is therefore to provide apparatus for causing an electron beam spot of a cathode ray tube to trace out a continuous line curve, which presents the appearance of a curve extending to a variable depth into the interior of the tube, as viewed in perspective from the front of the tube.

There are many applications for displays of this sort. One of the most useful of these is the display of a three-coordinate vector, the coordinate components of which are electrocardiograph signals picked up by three pairs of electrodes placed along mutually orthogonal line positions which define three coordinate axes through the heart muscle of a subject under observation. It would be particularly advantageous, to the cardiographic analyst, to have a three-dimensional real-time visible display of the trace of this vector. This, however, involves very expensive and complicated apparatus. Hence the present two-dimensional, three-coordinate display arrangement provides an effective, yet economical, substitute display, which affords a realistic view in perspective of the path traced out in space by the heart vector.

The preferred mode of utilization of the invention is therefore described below in connection with the use thereof in a three-coordinate electrocardiographic display, the associated system incorporating the present invention being therefore termed a perspective vectorcardioscope system. It should be clearly understood, however, that there are many other applications for such perspective displays.

A more specific object of this invention is to provide apparatus for causing the electron beam spot of a cathode ray tube to trace out a line curve representing a view in perspective of the trace of a three-coordinate vector, by continuously varying the apparent thickness of the line constituting the curve in accordance with one coordinate of the said vector.

Another and more specific object is to vary the apparent line thickness of an electron beam trace representing a three-coordinate vector in accordance with one of the coordinates of said vector, and to reinforce the perspective impression created thereby by compensating for brightness variations which are due to factors other than corresponding variations in the said one of the said coordinates of said vector.

An even more specific object is to vary the line thickness of a curve traced out by the indicating spot of a cathode ray tube display in accordance with one coordinate of a three-coordinate vector, and to reinforce the impression of perspective created thereby by varying the brightness of the said line in accordance with said one of said coordinates, while preventing variations in the said brightness due to factors other than variations in the said one of said coordinates.

Still another more specific object is to provide a cathode ray tube display representing a view in perspective of a three-coordinate vector, the components of which are the signals picked up by three pairs of orthogonally disposed electrocardiographic electrodes.

A cathode ray tube display according to the invention is obtained by causing the electron beam spot of the tube to trace out a continuous curve on the face of the tube in accordance with two of the three coordinates of a three-coordinate vector while varying the apparent thickness of the line constituting the curve in accordance with the remaining one of the three coordinates. The term "apparent" line thickness is used because according to one aspect of the invention, the line thickness is varied by superimposing high frequency oscillations onto the line trace so that the curved line is formed by the continuously modulated envelope of the oscillating trace. Thus, in this instance it is not the actual size of the electron beam spot which is varied. However, according to a second aspect of the invention the size of the electron beam spot is continuously varied in accordance with the remaining one of the three vector coordinates by applying the signal representing the remaining coordinate to the focusing structure of the cathode ray tube.

As an additional feature, signals representative of the speed of movement of the curve trace are applied to the brightness controls of the tube, so as to compensate for variations in brightness associated with the speed of generation of the curve, as the latter is not necessarily related to the depth coordinate of the indicating spot. In association with this feature of brightness control, additional circuits are provided for causing the brightness of the indicating spot to vary in accordance with the depth coordinate—i.e. the signal which is controlling the apparent line thickness—so that the illusion of depth perspective is further enhanced.

Another feature concerns the provision of circuits which introduce time reference signals, in the form of short-duration brightness fluctuations, into the curve trace, these time reference signals providing depth and trace motion references which further enhance the perspective illusion.

Still another feature concerns the provision, in a vectorcardioscope system, of a switching complex for selectively conveying any one of three vector coordinate signals to the depth perspective controls, while conveying the other two coordinate signals of the vector to the deflection controls of the cathode ray tube; the switching complex also selecting the polarity of the conveyed signals with respect to a ground reference, in such fashion that the resultant curve represents a view in perspective looking towards the three-coordinate vector from either above, below, in front, in back, to the left, or to the right thereof.

These and other objects and features of the invention may be more fully appreciated by considering the following detailed descriptions thereof taken in association with the accompanying drawings wherein:

FIG. 1 is a block diagram illustrating a system arrangement characteristic of the invention;

FIG. 2 is a more detailed block diagram showing of a perspective vectorcardioscope system in accordance with the general block diagram of FIG. 1;

FIG. 3 is a schematic drawing illustrating the switching circuits in the connecting unit 8 of FIGS. 1 and 2;

FIG. 6 is a schematic drawing of an alternative means for continuously varying the apparent line thickness along an electron beam trace, in accordance with a component of a three-coordinate vector;

Figure 4:
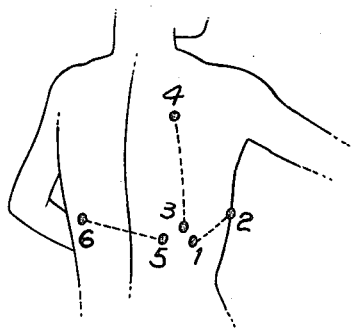
FIG. 4 is a drawing of an electrocardiographic subject illustrating the points of attachment of the three pairs of electrocardiographic electrodes which feed signals to the three pairs of input terminals shown in FIGS. 1 and 2.

Referring to FIGS. 1 and 2, the present invention will be described in connection with the application thereof to a perspective vectorcardioscope display arrangement. It should be clearly understood, however, that this is not intended as a limitation on the scope of the invention but is used only to show a preferred application thereof. In the figures there are shown three pairs of terminals 1–2, 3–4, and 5–6, to which are respectively coupled three signals, these being designated B, C, and D, respectively. The three signals are picked up by three corresponding pairs of electrocardiographic electrodes of conventional design, which electrodes are not shown in the drawing as they do not constitute a pair of the inventive apparatus. The not-shown electrodes are attached to strategic points on the body of a subject whose heart action is being investigated. These strategic points are illustrated in FIG. 4 by corresponding pairs of numbers 1–2, 3–4, and 5–6. The dotted lines shown in FIG. 4 between the points of each pair of points define three mutually orthogonal axes, which in turn define three mutually orthogonal planes. These planes are classified as follows to permit convenient reference thereto hereinafter.

The axes determined by the pairs of points 1–2 and 3–4 define what is commonly termed the sagittal plane through the heart of the subject. The lines through the pairs of points 5–6 and 3–4 define what is commonly called the frontal plane through the subject's heart. And the lines through the points 1–2 and 5–6 lie in what is commonly termed the horizontal plane through the heart of the subject.

It is noted that this placement of electrodes is only cited by way of example. Other three-coordinate attachment systems—e.g. the well-known Einthoven arrangement—are equally applicable, providing that the coordinate frame of reference is taken into account by the analyst in interpreting the resultant vector trace.

Suitable amplifiers may be provided between the not-shown electrodes and the three pairs of terminals in FIGS. 1 and 2 for amplifying the signals applied to these terminals. For convenience these amplifiers are also not shown as their construction is well known to those skilled in the art and also because they form no part of the present invention.

In addition to the three pairs of terminals 1–6, a common ground return terminal is indicated at 7. The three pairs of terminals, and the ground return terminal 7, are coupled to a connecting unit indicated at 8. The unit 8 is a switching complex by means of which selective connections are made between one terminal of each of the pairs 1–2, 3–4, 5–6, and the ground terminal 7, and also by means of which selective connections are individually made between the remaining terminals of the three pairs and the three output wires of the unit indicated at 10, 11, and 12. As presently employed the unit 8 comprises a manually operated switch, details of which are schematically shown in FIG. 3, and is discussed below.

The signals which are thus selectively channeled to the output conductors 10, 11, and 12 are respectively designated $x'$, $y'$, and $z'$. These signals are respectively coupled to $x$, $y$, and $z$ axes signal computing circuits indicated in block form at 13–15, respectively. The signals $x'$ and $y'$ on conductors 10 and 11 are also applied to the $z$ axis computing circuit 15 via additional connecting leads shown at 16 and 17, respectively, for purposes which are discussed below. Furthermore signals $z''$ and $z'''$ derived from the signal $z'$ are applied to the $y$ and $x$ computing circuits 14 and 13, respectively, via leads 18 and 19, respectively.

The signals on output leads 20, 21, and 22, of the respective computing circuits 13, 14, and 15 are designated $x$, $y$, and $z$, respectively. Leads 20 and 21 are connected to the horizontal and vertical deflection inputs 23 and 24 of a cathode ray tube system 25, which includes a cathode ray tube 26. Tube 26 is preferably coated with a phosphor exhibiting a wide dynamic range of luminescence, such as a P4 or P7 type phosphor. There are many commercially available cathode ray tube display systems which provide such tubes. The lead 22 is connected to a brightness control input 27 of the system 25.

The orthogonal display axes associated with the signals $x$, $y$, and $z$, are schematically indicated on the face of the tube 26 by the numeral 28. The illusion of depth perspective relative to the $z$, or depth, coordinate is controlled by all of the signals $x$, $y$, $z$ in a manner discussed below.

Referring mainly to FIG. 2, the $x$ axis computing circuit, indicated generally by the arrow 13, includes a summing amplifier 30 having input leads 31 and 32 connected thereto. Lead 31 is connected to one end of a variable summing resistor 33, the other end of which is connected to output lead 10 of connecting unit 8. Lead 32 is connected to a switch 34, closure of which connects lead 32 to the wiper arm 35 of a potentiometer 36. Potentiometer 36 is connected at one end thereof to ground, and at the other end thereof to output lead 19 (signal $z'''$) of $z$ axis computing circuit 15.

Similarly the $y$ signal computing circuit includes summing amplifier 37 having input lead connections 38 and 39. Lead 38 is connected to one end of variable resistor 40, the other end of which is connected to output conductor 11 of connecting unit 8, and lead 39 is connectable via switch 41 to the wiper arm 42 of a potentiometer 43, having a resistance connected between ground and output lead 18 (signal $z''$) of $z$ axis computing circuit 15.

The $z$ axis computing circuit comprises a summing amplifier 44 having five input leads 45–49 connected thereto. The leads 45–49 are respectively connected to five variable resistors 50–54, the inputs of which are as follows. The resistors 50 and 51 are respectively connected to differentiating circuits 55 and 56, which are in turn respectively connected to output leads 10 and 11 of connecting unit 8 via leads 16 and 17, respectively. Resistor 52 is connected via lead extension 12a, to output lead 12 (signal $z'$) of connecting unit 8. Resistor 53 is connected to the movable contact arm 57 of switch 58 which is supplied with $z=0$ reference pulses for reasons and by means described below. Finally, resistor 54 is connected to the output of a time marker brightness control circuit 59 which transfers short-duration pulses to summing amplifier 44 to introduce time reference marks into the cathode ray trace in a manner discussed below.

The brightness control circuit 59 has an input connection to a movable contact arm 60 of a switch indicated generally at 61, the function of which is discussed below.

A second lead extension 12b of the output lead 12 of unit 8 is connected to a balanced modulator circuit 62 and also to a $z'$ cross-over pulse producing network 63. The balanced modulator circuit amplitude modulates the constant amplitude carrier oscillations produced by an oscillator 64 in accordance with the amplitude of the signal $z'$ on lead 12. The period of the oscillations produced by oscillator 64 is preferably very small in relation to the average period of the signals $x'$, $y'$, and $z'$, the latter being the period associated with the contraction and relaxation of the subject's heart muscle. I have found that for the present electrocardiographic purpose, a carrier frequency of at least one megacycle provides a sufficiently small period. The need for a high frequency oscillation of this type will become apparent from the discussion which follows.

The balanced and modulated output of the modulator 62 is coupled to a difference amplifier 65 the output of which (signal $z''$) is applied to the output lead 18. Lead 18 is connected to the ungrounded end of a potentiometer 43 as mentioned above and also to a 90° phase shifting circuit 66, the output of which (signal $z'''$) is applied to lead 19. Thus it may be appreciated that the signals $z''$ and $z'''$ are amplitude modulated signals, the carrier oscillations of which are in quadrature phase relation, and the amplitudes of which vary in accordance with the signal $z'$ on lead 12. It may also be appreciated that upon closure of the switches 41 and 34 the signals $z''$ and $z'''$ are respectively superimposed on the $y'$ and $x'$ inputs of the summing amplifiers 37 and 30, respectively. The effect of this, it will be appreciated, is to introduce high frequency oscillations onto the trace which would have ordinarily been swept out by the $x'$ and $y'$ signals, as indicated in the sample trace shown in FIG. 5.

Figure 5:
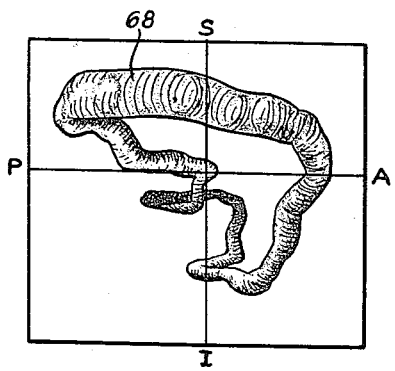
FIG. 5 is a drawing of a sample curve traced out on the face of a cathode ray tube by the system shown in FIG. 2.

As indicated in FIG. 5 the sample trace consists of circular loops 68 which vary continuously in amplitude so as to provide a tapering curve envelope, and thereby to provide the perspective illusion of a curved line or helix of varying thickness. The axes shown in FIGURE 5 reveal the relative position of the trace; i.e. axis designations A, P, S, and I represent respectively the portions of the body namely anterior, posterior, superior, and inferior (front, rear, upper, and lower).

Thus, disregarding for the moment the effect of the inputs to resistors 53 and 54 of summing amplifier 44, the operation of the system shown in FIG. 2 is as follows. Selected phases of the three pairs of signals representing the three heat vector coordinates are applied through the connecting unit 8 to selected ones of output leads 10, 11, and 12. The signals on leads 10 and 11 are coupled through summing amplifiers 30 and 37, respectively, to the horizontal and vertical deflecting elements of cathode ray tube 26, to thereby position the indicating spot on the face of said tube in accordance with the two vector components represented by the signals on leads 10 and 11. The third signal component, that on lead 12, is used to modulate the high frequency output of oscillator 64 via modulator 62. The modulated high frequency signal is phase shifted by 90° and the two high frequency signals are respectively summed with the $y'$ and $x'$ inputs of the amplifier 37 and 30, so as to cause the indicating spot on the cathode ray tube to move in a spiral of varying diameter, which is the projection on the tube face of a helix extending into the tube in accordance with the depth vector coordinate signal $z'$ on lead 12. By this means the thickness of the line traced out by the $x'$, $y'$ inputs is apparently varied in accordance with the $z'$ input, thereby providing a required respective impression as may be seen in the sample trace of FIG. 5.

It is interesting to note in this respect that a somewhat less favorable line thickening effect may be produced by leaving either switch 34 or the switch 41 in the open condition. In that event the spiral loops 68 degenerate to either vertical or horizontal line segments which taper in length as they are generated in the z-direction. Hence, in some instances, the switch 34 and the 90° phase shifting network 66 may be dispensed with, the resultant trace of the indicating spot then presenting a somewhat less vivid perspective impression than that of the complete arrangement shown in FIG. 2.

The summing amplifier 44 provides a brightness control signal which includes the signal $z'$ conveyed by leads 12 and 12a, as well as the outputs of differentiating circuits 55 and 56 superimposed thereon. Thus it will be appreciated that by virtue of the $z'$ input via lead 12a the brightness is varied in correspondence with the apparent line thickness variation, thereby further enhancing the depth perspective impression. It will further be appreciated that by virtue of the output of differentiating circuits 55 and 56, the brightness of the indicating spot of the cathode ray tube 26 is caused to vary in accordance with the rates of variation of the $x'$ and $y'$ signals on conductors 10 and 11, respectively. The advantage of this is, of course, that it compensates for opposite variations in brightness due to the speed of movement of the indicating spot, which opposite variations are not necessarily related to the intended depth position of the spot. By means of such compensation the depth perspective impression, caused by the brightness variation signal on lead 12a, is maximally reinforced.

Continuing now with a description of the inputs to resistors 53 and 54 of summing amplifier 44, and an evaluation of the effects produced thereby, the following is noted. The $z'$ cross-over pulse network 63 feeds a pulse to either output conductor 80 or 81 for each zero cross-over of the voltage difference between the voltages on conductors 12b and 82. The pulses applied to conductor 80 are produced when the voltage difference passes through zero in a positive going sense while the pulse produced on conductor 81 occurs as the voltage difference goes through zero in a negative going sense. Conductor 82 is supplied with a reference potential representing $z=0$ plane via a wiper arm 83 on a potentiometer 84, which includes a resistance connected between sources of positive and negative potential, indicated at 85 and 86, respectively.

The network 63 includes a voltage comparator, or difference amplifier circuit 63a of well-known design, which provides a steep rising and falling voltage output according to the difference between the voltages on conductors 12b and 82, followed by a Schmitt trigger circuit 63b (cathode coupled binary) also of well-known design, which is coupled to the comparator 63a and which flips from a first to a second stable condition as the comparator difference output goes positive and reverts to the first stable condition as the difference output goes negative. The opposite phase outputs of the Schmitt circuit, after suitable differentiation and rectification, to produce the required short-duration input pulses, are applied to the output leads 80 and 81.

The signals on leads 80 and 81 are applied to set and reset inputs 90 and 91, respectively, of a flip-flop 92, corresponding outputs of which are respectively connected to terminals 93 and 94 as shown. The leads 80 and 81 are also directly connected to terminals 87 and 88, respectively, as shown in FIG. 2, the four terminals 87, 88, 93, and 94, being arranged for selective connection to the resistor 53 via the previously mentioned movable contact arm 57 of switch 58. Thus, if arm 57 is connected to terminal 87 or 88 short-duration brightness fluctuations are superimposed on the cathode ray tube trace, as the indicating spot passes through a hypothetical $z=0$ reference plane lying midway between the face of the oscilloscope and the furthermost "depth excursion" of the trace spot while if the arm 57 is connected to one of the flip-flop outputs, the trace brightness will be discretely increased by a given amount in either the near or the distal field depending upon whether terminal 93 or terminal 94 is connected to the arm 57. Thus a spatial reference is provided which additionally enhances the perspective impression.

The contact arm 60 of switch 61 is connected to oppositely phased outputs of a monostable multivibrator 100 which is triggered at a predetermined repetition frequency by an oscillator 101, the frequency of which is controllable over the range 0–50 kc. The opposite phase output pulses of multivibrator 100, are positive and negative going signals, indicated respectively at 101 and 102. One of these pulse signals is applied, depending upon the position of switch 60, to the previously noted time marker brightness decay control circuit 59, to provide a corresponding pulse output as shown at 103 or 104, respectively. The output of circuit 59 is thus a steep rising negative or positive pulse which, upon application to the brightness control input via resistor 54 introduces reference brightness pulsations which decay at a predetermined rate, into the display trace itself, thus providing distinctive time marker references on the trace, which represent equal time intervals, and which thus permit more accurate observation and analysis of the trace contour by emphasizing non-uniform z-displacements.

The predetermined rate of decay of the output of circuit 59 is preferably adjustable within limits such that a definite "comet-tail" effect is introduced into the trace, in each marked interval, a sense of the direction of trace movement, in depth, being conveyed thereby, further distinguishing the "near" and "far" portions of the trace, and thereby further emphasizing and clarifying the depth perspective impression.

As shown in FIG. 3 the connecting unit 8 generally comprises a six-segment switch 110 having selectable switch sections $S_1$, $S_2$, $H_1$, $H_2$, $F_1$, $F_2$, only one of which is operated for each switch position. I prefer to use a Six Button Lock-out Strip Switch (Capitol SP–206) for this purpose. For each operated section, one conductor of each input pair 1–2, 3–4, and 5–6 is connected to the ground terminal 7, while the other conductors of the three pairs are individually connected to output conductors 10, 11, and 12. Considering section $H_1$, for example, when this section is operated terminals 2, 3, and 5, are connected to ground terminal 7, while terminals 1, 4, and 6 are respectively connected to leads 11, 12, and 10.

The remainder of the circuitry in FIG. 3 is connected as in FIG. 2. Specifically, conductor 10 is connected to x-axis computing circuit 13, conductor 11 is connected to y-axis computing circuit 14, conductors 10 and 11 are respectively connected via the differentiating capacitors 55a and 56a—which are respective elements of the differentiating networks 55 and 56 shown in FIG. 2—to the z-axis computing circuit 15, which in FIG. 3 is designated perspective coding circuits for obvious reasons. Conductor 12 is also connected to the circuit 15. Finally, output leads 18 and 19 of circuit 15 are connected to circuits 14 and 13, respectively.

As indicated at the lower left in FIG. 3 the oscilloscope trace when section $S_1$ of switch 110 is operated, represents a view looking towards the sagittal plane from the right side of the subject. Similarly, when switch section $S_2$ is operated the view is towards the sagittal plane from the left. Likewise when switch section $H_1$ or $H_2$ is operated, the view is towards the horizontal plane from either above or below, respectively, and when switch section $F_1$ or $F_2$ is selected, the view is towards the frontal plane from either in front or in back thereof.

The specific details of the z' cross-over pulse network 63, the flip-flop circuit 92, the monostable multivibrator 100, and the time marker oscillator circuit 101 have been omitted, as the discussion thereof might tend to obscure the invention, and also because such details are well known to those skilled in the art. For the same reason, the brightness decay control circuit 59 has not been shown. For the summing amplifiers 30, 37, and 44, I prefer to use Philbrick type $K_2xA$ amplifiers, or the equivalent thereof.

Figure 7:
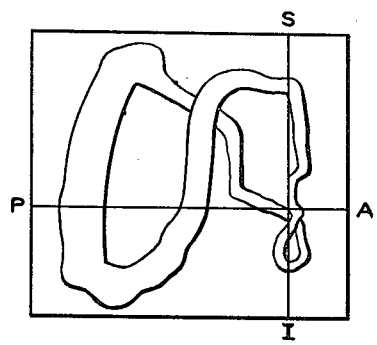
FIG. 7 is a sample trace swept out on the face of a cathode ray tube in which the apparent line thickness is varied by the circuit arrangement shown in FIG. 6.

Referring to FIG. 6, and the associated sample trace shown in FIG. 7, in an alternative circuit arrangement, for obtaining perspective thickness variations in the lines of the cathode ray tube trace, only the signals x' and y' are applied to the horizontal and vertical deflecting elements of tube 26, thereby eliminating summing amplifiers 30 and 37 and the associated circuit components 31–36, and 38–43 of FIG. 2. Further, the signal z' is applied directly to electrostatic focus control structure 200 of tube 26', thereby eliminating the circular modulation arrangement including oscillator 64, modulator 62, difference amplifier 65 and 90° phase shifter 66, of FIG. 2. The rest of the circuit is the same as that in FIG. 2.

Thus, in FIG. 6 the area of the indicating spot, and therefore the actual thickness of the trace line, are varied directly by the z' vector component. While this arrangement is obviously simpler and more economical, it does have a disadvantage in relation to the system in FIG. 2 in that the range of thickness variation of the former is limited by the range of permissible variation of the tube focus control structure.

While I have described above the principles of my invention in connection with specific apparatus, it is to be clearly understood that this description is made only by way of example and not as a limitation to the scope of my invention as set forth in the objects thereof and in the accompanying claims.

Accordingly, I claim:

1. In an electrocardiographic vector display system for displaying, by means of the indicating spot of a cathode ray tube, the three-coordinate vector which is the resultant of the outputs of three orthogonally related pairs of electrodes, the combination of:
   a cathode ray tube,
   means including three distinct circuit paths for conveying three electrocardiograph signals representing components of a three-coordinate vector,
   means coupled to all three of said circuit paths of said signal conveying means and to said tube for causing the indicating spot of said tube to trace out a curve, in accordance with two of said three signal components, the apparent line thickness of which varies in accordance with the remaining one of said signal components,
   means coupled to one of said circuit paths and to the brightness controls of said tube for varying the indicating spot brightness in accordance with said remaining signal component, and hence in conformance with said apparent line thickness variation, and
   means coupled to the brightness control of said tube for superimposing reference time marker brightness fluctuations into said curve trace which serve as depth references, and which have a rate of decay tending to introduce a sense of movement in depth—e.g. a tapering tending to "comet-like" appearance—into the trace, so as to further emphasize and clarify the appearance of depth perspective created by said line thickness and brightness varying means.

2. In apparatus of the class described, for causing the electron beam spot of a cathode ray tube to trace out a perspective view of a curve, which therefore appears to extend to a variable depth into the interior of the tube as viewed in perspective from the front of the tube, the combination of:
   a cathode ray tube,
   means electrically coupled to said tube for causing the indicating spot thereof to trace out a continuous line curve on the face of said tube, and
   means coupled with said curve tracing means for continuously varying the focusing of said indicating spot on the face of said tube, thereby progressively varying the area of the spot and, consequently the actual thickness of said line, whereby said curve appears to be a view in perspective of a curve in space extending into the interior of said tube.

3. In apparatus of the class described for causing the electron beam spot of a cathode ray tube to trace out a perspective view of a curve, which therefore appears to extend to a variable depth into the interior of the tube as viewed in perspective from the front of the tube, the combination of:

a cathode ray tube;

means electrically coupled to said tube for causing the indicating spot thereof to trace out a continuous line curve on the face of said tube, means coupled with said curve tracing means for continuously varying the apparent thickness of the line constituting said curve, whereby said curve appears to be a view in perspective of the curve in space extending into the interior of said tube, means coupled to said apparent line thickness varying means and the brightness controls of said tube for varying the brightness along said curve in accordance with the output of said thickness varying means, whereby the brightness of said line is progressively varied along with and in proportion to said apparent thickness thereof to enhance the depth perspective impression created thereby, and means coupled to said apparent line thickness varying means and the brightness controls of said tube providing a small reference depth mark on the said curved trace by generating a momentary fluctuation in the brightness of the electron beam spot during said progressive variation of the brightness along said line.

4. In an electrocardiographic display system for displaying the trace of the three-coordinate vector corresponding to the vector sum of the outputs of three pairs of electrocardiographic electrodes strategically attached to a subject along three mutually orthogonal axes which define sagittal, frontal, and horizontal planes through the subject's heart, the combination of:

a horizontal deflection signal computing circuit including a summing amplifier having two signal inputs, a vertical deflection signal computing circuit including a summing amplifier having two signal inputs, a brightness (Z-axis) signal computing circuit including a summing amplifier circuit having five inputs, a display axis signal selection switching circuit having three pairs of signal input leads and three signal outputs and further including means for connecting one lead of each said input pair to a common ground return, means for connecting the remaining leads of said input pairs to said three signal outputs in any order, means for coupling a first of said three signal outputs to one of two inputs of said horizontal deflection signal computing circuit, means for coupling a second of said outputs to one of the two inputs to said vertical deflection signal computing circuit, and means for coupling a third of said outputs to a first of said five inputs of said brightness signal computing circuit, a first differentiating circuit connected between said first signal output of said display axis selection circuit and a second of said five inputs of said brightness signal computing circuit.

a second differentiating circuit connected between said second signal output of said display axis selection circuit and a third of said five inputs of said brightness computing circuit, a source of high frequency oscillations, a balanced modulator circuit having two outputs and two inputs, one of said inputs being connected to said oscillator, and the other of said inputs being connected to said third signal output of said display axis selection circuit, a difference amplifier having two signal inputs respectively coupled to the outputs of said balanced modulator, and an output connection to said second variable input resistor of said vertical deflection computing circuit, a circuit for producing a 90° phase shift in said high frequency oscillations coupled between said output connection of said difference amplifier and the other of said two inputs of said horizontal deflection computing circuit, a source of reference D.C. potential representing a $z=0$ voltage, a $z=0$ cross-over pulse network circuit having input connections from said reference potential source and from the third signal output of said display axis selection circuit, and having two output connections, a bistable circuit having two inputs respectively connected to said two output connections of said $z=0$ cross-over circuit and having two output connections, means selectively connectable to either output connection said $z=0$ cross-over circuit or of said bistable circuit for transferring a signal therefrom to the fourth of said five inputs of said brightness computing circuit, a time marker oscillator, a monostable circuit for producing pulses in response to signal oscillations issuing from said time marker oscillator, and means coupled between said monostable circuit and the fifth of said five inputs of said brightness computing circuit for intermittently varying the amplitude of the intensity control signal of the output thereof in accordance with the output of said monostable circuit.

References Cited by the Examiner
UNITED STATES PATENTS

| 2,447,018 | 8/48 | Keinath | 128—2.05 |
| 2,659,363 | 11/53 | Brosselin | 128—2.06 |
| 2,676,283 | 4/54 | Becking | 315—24 |
| 2,860,284 | 11/58 | McKim | 315—22 |

OTHER REFERENCES

Rider and Uslam: Encylclopedia of Cathode Ray Oscilloscopes and their Uses, published by Rider, New York, 1959, 2nd Edition, pages 5–9.

RICHARD A. GAUDET, *Primary Examiner.*

L. R. PRINCE, *Examiner.*